(12) United States Patent
Malsam

(10) Patent No.: US 7,384,008 B1
(45) Date of Patent: Jun. 10, 2008

(54) LASER ALIGNMENT SYSTEM FOR A MECHANIZED IRRIGATION SYSTEM

(76) Inventor: Craig S. Malsam, 17914 Shirley Cir., Omaha, NE (US) 68130

( * ) Notice: Subject to any disclaimer, the term of this patent is extended or adjusted under 35 U.S.C. 154(b) by 0 days.

(21) Appl. No.: 11/699,236

(22) Filed: Jan. 29, 2007

Related U.S. Application Data

(60) Provisional application No. 60/780,676, filed on Mar. 9, 2006.

(51) Int. Cl.
- *B05B 3/18* (2006.01)
- *B05B 3/00* (2006.01)
- *G01B 11/27* (2006.01)
- *G01B 11/26* (2006.01)

(52) U.S. Cl. ............... 239/731; 239/728; 239/730; 239/733; 356/153

(58) Field of Classification Search ............ 239/728, 239/730–733, 722, 723, 726, 735; 356/153, 356/72, 400; 385/52
See application file for complete search history.

(56) References Cited

U.S. PATENT DOCUMENTS

| | | | | |
|---|---|---|---|---|
| 3,823,730 A | * | 7/1974 | Sandstrom et al. ......... | 239/731 |
| 3,952,769 A | * | 4/1976 | Ott .............................. | 239/731 |
| 4,034,778 A | * | 7/1977 | Sage et al. .................. | 239/731 |
| 4,041,975 A | * | 8/1977 | Ames ........................... | 239/731 |
| 4,073,309 A | * | 2/1978 | Fraser et al. ................ | 239/731 |
| 4,099,669 A | * | 7/1978 | Cortopassi .................... | 239/1 |
| 4,149,570 A | * | 4/1979 | Hunter ........................ | 239/731 |
| 4,191,207 A | | 3/1980 | Jacobi et al. | |
| 4,290,556 A | * | 9/1981 | McConnell .................. | 239/731 |
| 4,371,116 A | * | 2/1983 | Sage et al. .................. | 239/731 |
| 4,518,855 A | * | 5/1985 | Malak ....................... | 356/141.3 |
| 4,580,731 A | * | 4/1986 | Kegel et al. ................ | 239/731 |
| 5,255,857 A | * | 10/1993 | Hunt .......................... | 239/731 |
| 2003/0066912 A1 | * | 4/2003 | Krieger et al. .............. | 239/731 |

\* cited by examiner

*Primary Examiner*—Darren W Gorman
(74) *Attorney, Agent, or Firm*—Thomte Patent Law Offfice; Dennis L. Thomte

(57) ABSTRACT

A laser alignment system is provided for a mechanized irrigation system with the laser alignment system being operatively connected to the drive tower motors of the irrigation system to maintain the spans of the irrigation system in alignment.

3 Claims, 3 Drawing Sheets

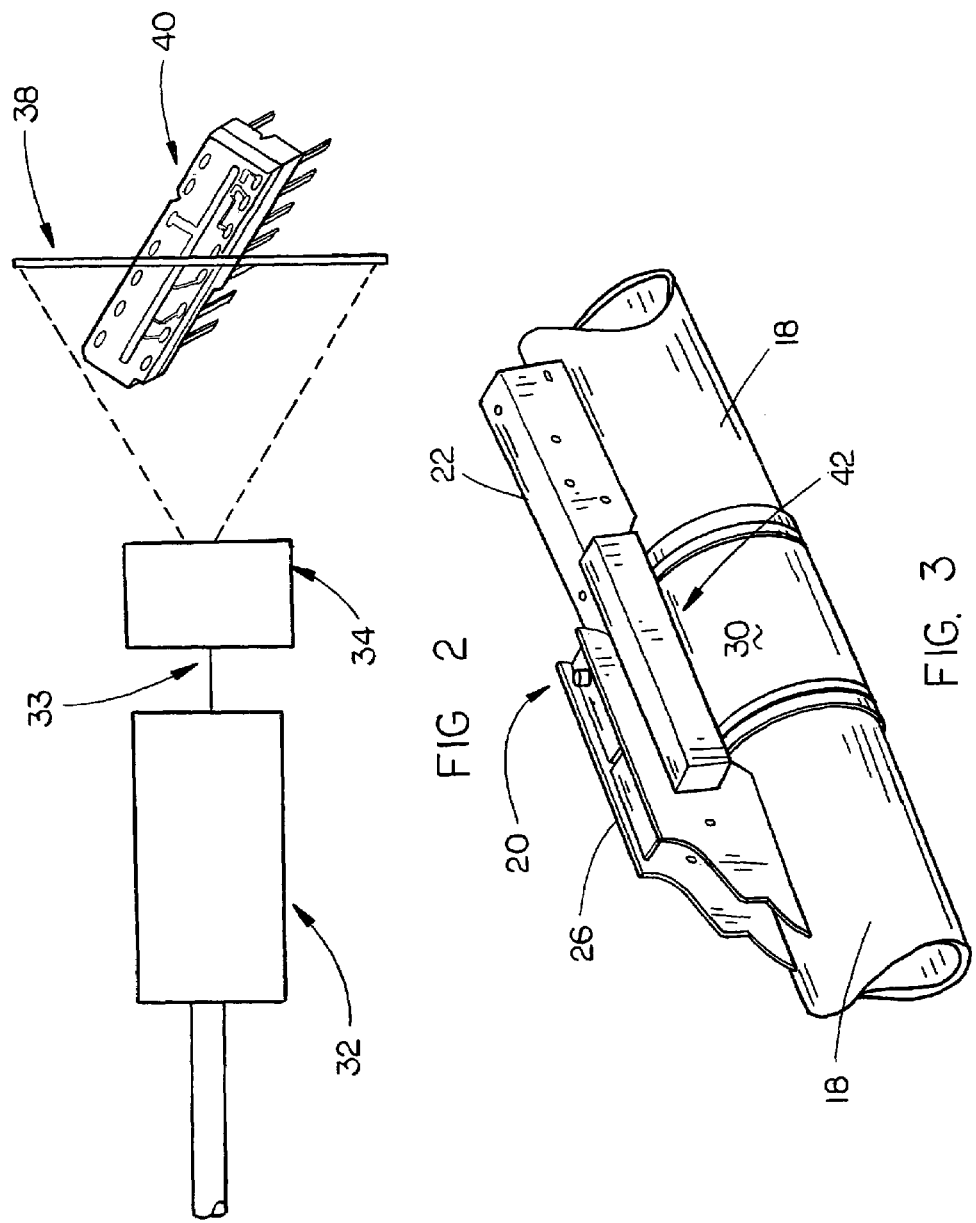

LASER ALIGNMENT SYSTEM FOR A MECHANIZED IRRIGATION SYSTEM

CROSS-REFERENCE TO RELATED APPLICATION

This application claims the benefit of U.S. Provisional Application Ser. No. 60/780,676 entitled LASER ALIGNMENT SYSTEM FOR A MECHANIZED IRRIGATION SYSTEM filed Mar. 9, 2006, the disclosure of which is hereby incorporated herein by reference.

BACKGROUND OF THE INVENTION

1. Field of the Invention

Mechanized irrigation systems such as center pivot irrigation systems, corner irrigation systems and linear irrigation systems normally utilize a mechanical alignment mechanism between adjacent spans for maintaining the spans of the system in alignment as the system is moved over the area to be irrigated. Problems associated with prior art mechanical alignment systems include tolerance stack-up, improper installation, improper maintenance, and failure due to mechanical wear of moving parts.

SUMMARY OF THE INVENTION

An alignment system for a mechanized irrigation system is provided wherein a laser diode is utilized to create a single point light source which is passed through a laser line generator to create a laser "line". A light sensor array measures the alignment of the laser source relative to the light sensor array. The alignment information is used to control the actuation and deactivation of the drive unit motors to maintain the water pipeline of the irrigation system in alignment.

It is therefore a principal object of the invention to provide an improved alignment system for a mechanized irrigation system.

A further object of the invention is to provide an alignment system utilizing laser technology.

A further object of the invention is to provide an alignment system of the type described which eliminates problems associated with the mechanical alignment of current mechanized irrigation systems.

These and other objects will be apparent to those skilled in the art.

BRIEF DESCRIPTION OF THE DRAWINGS

FIG. 2 is a perspective view of a laser module creating a single point light source which is passed through a line generator to create a laser line and its relationship with respect to a light sensor array IC; and FIG. 3 is a perspective view of the alignment system mounted on the ball and hitch joint of a mechanized irrigation system.

DETAILED DESCRIPTION OF THE INVENTION

Figure 1:
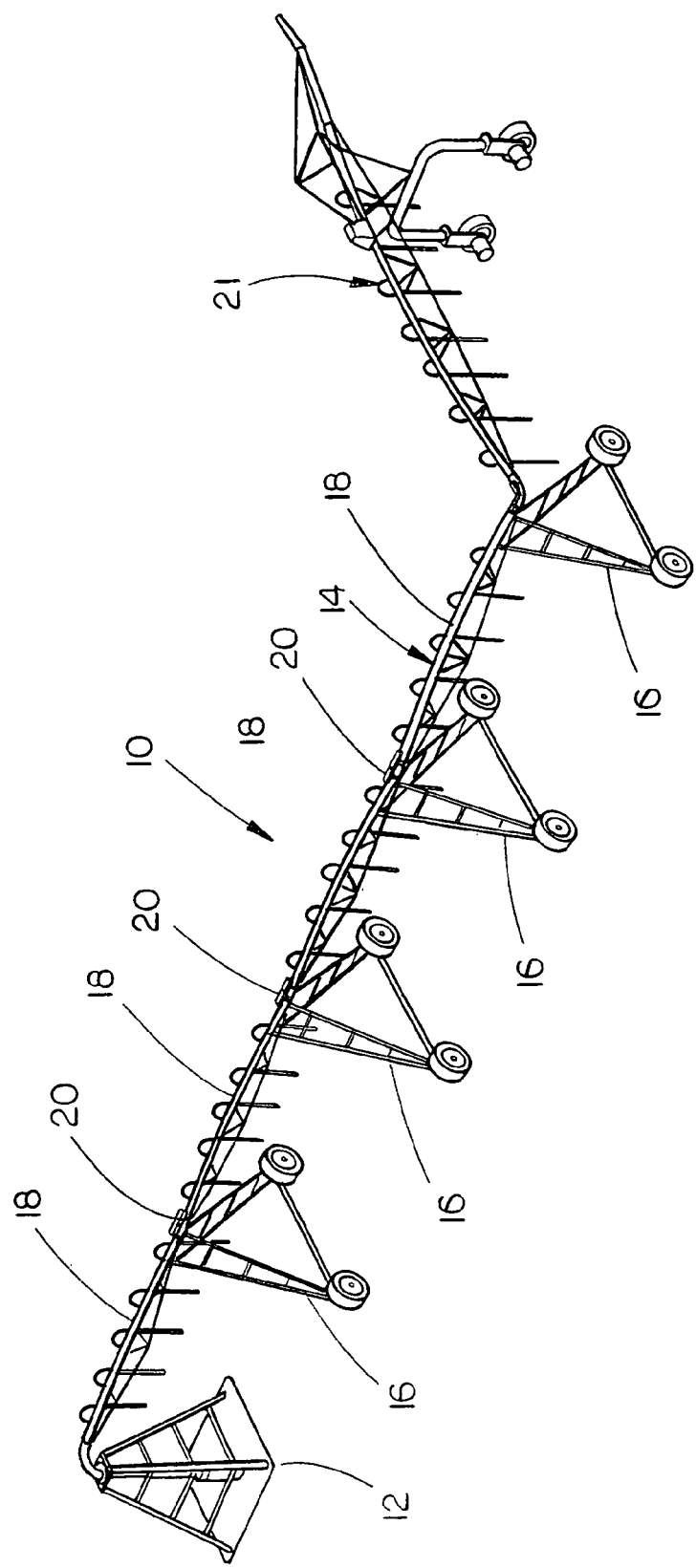
FIG. 1 is a perspective view of a mechanized irrigation system.

The numeral 10 refers generally to a conventional mechanized center pivot irrigation system with a corer system. The laser alignment system of the invention may be used in a center pivot irrigation system, a center pivot irrigation system with a corner system, or a linear move irrigation system. In FIG. 1, the mechanized irrigation system 10 includes a center pivot structure 12 having a water pipeline 14 extending outwardly therefrom having a plurality of spaced-apart drive units or towers 16 which support the spans 18 of the pipeline 14. The spans 18 are joined together by a flexible joint 20 which is usually located adjacent or near the downstream side of each of the drive units 16. Each of the drive units 16 includes a drive motor for driving the wheels of the drive units 16 to propel the irrigation system over the area to be irrigated in conventional fashion. In FIG. 1, a conventional corner system 21 is shown as being attached to the outer end of the pipeline 14 adjacent the outermost drive unit 16.

Figure 1A:
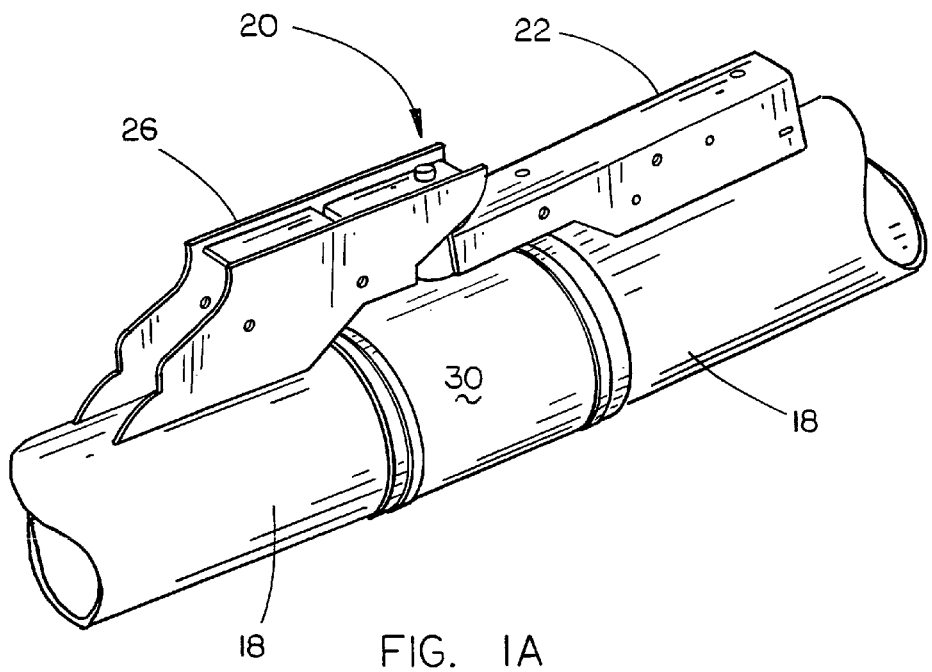
FIG. 1A is a perspective view of a typical flexible joint utilized between the spans on the irrigation system of FIG. 1.
Figure 1B:
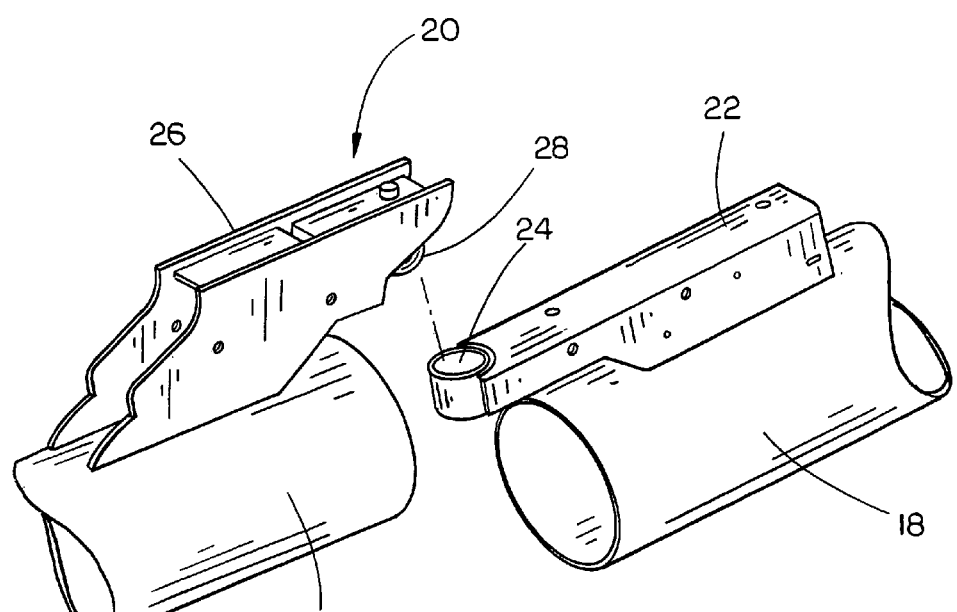
FIG. 1B is an exploded perspective view of the joint of FIG. 1A except that the flexible sleeve or boot has not been shown.

The flexible joints 20 may take several different forms, but one of the most common types of a joint 20 is shown in FIGS. 1A and 1B. As seen in FIG. 1B, the outer end of a span 18 has a support structure 22 mounted thereon which has an upwardly presented socket 24 formed therein. A support structure 26 is mounted on the inner end of the next adjacent span 18 and has a downwardly projecting hitch ball 28 at its inner end which is adapted to be received by the socket 24 therein to pivotally connect the adjacent spans 18 in a ball hitch fashion. As seen in FIG. 1A, a flexible boot or sleeve 30 embraces the adjacent open ends of the spans 18 to enable the irrigating water to pass from one span to another. It is to this type of flexible joint, or other types of flexible joints, that the laser alignment system of this invention is utilized. The flexible joint described above permits the adjacent spans 18 to pivot with respect to one another primarily about a vertically disposed axis, but also a horizontally disposed axis to some degree.

Referring to FIG. 2, the numeral 32 refers to a laser light source such as the LDM-4 Laser Diode Module from Laserex Technologies, P.O. Box 177, Unley, SA 5061, Australia, to create a single point light source 33 with the single point light source being passed through a line generator 34 such as the L45 Laser Line Generator from Laserex Technologies, P.O. Box 177, Unley, SA 5061, Australia. The passage of the single point light source 33 through the line generator 34 creates a laser line referred to generally by the reference numeral 38. Using a laser line instead of a laser point makes the alignment system immune to vertical movement of the adjacent spans, relative to each other, while maintaining monitoring of side-to-side movement of the adjacent spans relative to each other. The numeral 40 refers to a light sensor array IC, such as the TAOS TSL1401 or equivalent. The light sensor array 40 could also consist of a series of closely spaced, individual photodiodes. The alignment information is used to control the movement of the drive unit motors on the irrigation system 10 to maintain the spans 18 in alignment. The alignment system of this invention is housed in a compartment 42 so as to be mounted across the joint 20 (FIG. 3). Mounting the alignment system of this invention in a single compartment 42 results in the light source 32, line generator 34 and light sensor array 40 being isolated from dirt and moisture and other contaminates that may impact the performance of the optical components. The module or compartment 42 is rigidly mounted to the structure, as shown in FIG. 3, but the housing around the light source and sensor is flexible to accommodate the movement in the joint 20. The light source 32 is on the left span of the system and the light sensor array 40 is positioned on the right span of the system. The output from the light sensor array 40 is used to determine the position of the adjacent towers or drive units relative to each other, and control the speed of the motors associated with the tower joint.

During installation, the drive units of the irrigation system are manually aligned, similar to the manner in which it is practiced today. Once aligned, a "Zero" point is logged into the memory of the module via a service tool or button on the module housing. This process is repeated for each tower. During the life of the machine, no other maintenance or adjustment is required. Since there are no moving parts, there are not parts to wear out that would require replacing. During operation, for on/off motors on the drive units, an upper and lower threshold would be stored in the module memory. The motors would turn on and off when these upper and lower threshold values are met. During operation for variable speed motors, the output of the sensor would directly control the speed of the motors of the towers.

To summarize the invention, the theory of the operation of the system is stated hereinbelow:

1. Using a laser module, a single point light source is created;
2. A line generator is utilized to create a laser line;
3. The laser module and line generator are positioned on one of the joint members of a flexible joint positioned between adjacent pipe spans of a mechanized irrigation system;
4. A light sensor array is positioned on the other joint member of the flexible joint;
5. The alignment of the laser source relative to the light sensor array is measured; and
6. The alignment information is used to control the actuation and deactivation of the drive unit motors to maintain the water line in alignment.

Thus it can be seen that the invention accomplishes at least all of its stated objectives.

I claim:

1. An irrigation system, comprising:
   a plurality of pipe spans joined together to form an elongated pipeline;
   each of said pipe spans supported upon an associated drive unit to propel said water pipeline over the area to be irrigated;
   each of said drive units including a drive unit motor;
   a flexible joint between adjacent pipe spans including first and second joint members secured to adjacent pipe spans, respectively;
   said first and second joint members being pivotally secured together about horizontal and vertical axes;
   and a laser alignment system associated with said first and second joint members which senses alignment information of the adjacent pipe spans to control the operation of the drive motor on the associated drive unit to maintain the adjacent pipe spans in proper alignment;
   said laser alignment system including a laser light source mounted on said first joint member and a light sensor array mounted on said second joint member;
   said laser light source creating a single point light source which is directed towards said light sensor array;
   said laser alignment system also including a line generator positioned between said laser light source and said light sensor array which is in the path of the single point light source and which creates a vertically disposed laser line which is sensed by said light sensor array whereby the alignment of the laser light source relative to the light sensor array may be measured to control the activation and deactivation of the associated drive motor to maintain the pipeline in alignment.

2. The irrigation system of claim 1 wherein said line generator is positioned on said first joint member.

3. The irrigation system of claim 2 wherein said laser light source, said line generator and said light sensor array are housed in a compartment which is mounted across the flexible joint so that said laser light source, said line generator and said light sensor array are isolated from dirt, moisture and other contaminates.

* * * * *